(12) United States Patent
Shankar et al.

(10) Patent No.: US 10,176,430 B2
(45) Date of Patent: Jan. 8, 2019

(54) APPLYING LIVE CAMERA COLORS TO A DIGITAL DESIGN

(71) Applicant: Adobe Systems Incorporated, San Jose, CA (US)

(72) Inventors: Satish Shankar, Seattle, WA (US); Shawn Sheridan, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/947,683

(22) Filed: Nov. 20, 2015

(65) Prior Publication Data

US 2017/0032542 A1 Feb. 2, 2017

Related U.S. Application Data

(60) Provisional application No. 62/198,537, filed on Jul. 29, 2015.

(51) Int. Cl.
| | | |
|---|---|---|
| *G06K 9/62* | (2006.01) | |
| *G06F 3/0484* | (2013.01) | |
| *G06T 11/60* | (2006.01) | |
| *G06N 7/00* | (2006.01) | |
| *G06K 9/00* | (2006.01) | |
| *G06T 11/00* | (2006.01) | |
| *G06F 3/0488* | (2013.01) | |
| *G11B 27/031* | (2006.01) | |

(52) U.S. Cl.
CPC .......... *G06N 7/005* (2013.01); *G06F 3/0484* (2013.01); *G06F 3/0488* (2013.01); *G06F 3/04842* (2013.01); *G06K 9/00221* (2013.01); *G06K 9/00463* (2013.01); *G06K 9/6215* (2013.01); *G06K 9/6271* (2013.01); *G06T 11/001* (2013.01); *G06T 11/60* (2013.01); *G11B 27/031* (2013.01); *G06T 2207/10016* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 5,860,073 A | 1/1999 | Ferrel et al. | |
| 6,298,157 B1 | 10/2001 | Wilensky | |
| 6,809,741 B1 * | 10/2004 | Bates | G06F 3/0481 345/597 |
| 7,308,418 B2 | 12/2007 | Malek et al. | |

(Continued)

OTHER PUBLICATIONS

U.S. Appl. No. 14/942,503, Jan. 1, 2017, 1st Action Interview OA Summary.

(Continued)

*Primary Examiner* — Aaron M Richer
(74) *Attorney, Agent, or Firm* — Keller Jolley Preece

(57) ABSTRACT

The present disclosure is directed toward systems and methods for extracting colors from a live camera feed and applying the extracted colors to a user's input digital design. For example, in response to the user targeting the camera of a client-computing device at a fixed position for a threshold amount of time, one or more embodiments described herein extracts a palette of dominant colors from the live camera feed and maps the palette of dominant colors onto one or more colors of the user's input digital design in real time.

20 Claims, 10 Drawing Sheets

(56) References Cited

U.S. PATENT DOCUMENTS

| | | |
|---|---|---|
| 8,041,111 B1 | 10/2011 | Wilensky |
| 8,416,255 B1 | 4/2013 | Gilra |
| 8,429,524 B2 | 4/2013 | Balinsky et al. |
| 8,849,043 B2 | 9/2014 | Ptucha et al. |
| 8,849,853 B2 | 9/2014 | Ptucha et al. |
| 8,872,969 B1 * | 10/2014 | Rathi .................... G06T 11/001 348/468 |
| 9,110,977 B1 | 8/2015 | Pierre et al. |
| 9,639,969 B1 | 5/2017 | Wilson et al. |
| 2001/0054050 A1 | 12/2001 | Weil et al. |
| 2003/0063130 A1 * | 4/2003 | Barbieri ............... G11B 27/105 715/833 |
| 2004/0196298 A1 | 10/2004 | Nagahashi et al. |
| 2005/0195331 A1 * | 9/2005 | Sugano ............ G06F 17/30799 348/571 |
| 2010/0199168 A1 | 8/2010 | Balinsky et al. |
| 2010/0223581 A1 | 9/2010 | Manolescu et al. |
| 2011/0026835 A1 | 2/2011 | Ptucha et al. |
| 2011/0157226 A1 | 6/2011 | Ptucha et al. |
| 2011/0261994 A1 | 10/2011 | Cok |
| 2011/0261995 A1 | 10/2011 | Cok |
| 2011/0273474 A1 | 11/2011 | Iwayama |
| 2013/0111324 A1 | 5/2013 | Kern et al. |
| 2013/0198617 A1 | 8/2013 | Maloney et al. |
| 2013/0315477 A1 | 11/2013 | Murray et al. |
| 2014/0173397 A1 | 6/2014 | Pereira et al. |
| 2014/0359656 A1 * | 12/2014 | Banica ................. H04N 21/812 725/32 |
| 2015/0002696 A1 * | 1/2015 | He ..................... H04N 5/23222 348/231.6 |
| 2015/0379000 A1 * | 12/2015 | Haitani ............... G06F 17/3025 707/745 |
| 2016/0093080 A1 | 3/2016 | Tumanov et al. |
| 2016/0142625 A1 | 5/2016 | Weksler et al. |
| 2016/0148343 A1 | 5/2016 | Yan et al. |
| 2017/0032269 A1 | 2/2017 | Portilla et al. |
| 2017/0032553 A1 | 2/2017 | O'Donovan |
| 2017/0032554 A1 | 2/2017 | O'Donovan et al. |
| 2017/0357913 A1 | 12/2017 | Garrison et al. |

OTHER PUBLICATIONS

U.S. Appl. No. 14/937,619, Feb. 16, 2017, Preinterview 1st OA.
U.S. Appl. No. 14/937,619, Mar. 31, 2017, Office Action.
U.S. Appl. No. 14/942,503, Oct. 4, 2016, Preintervierw 1st OA.
U.S. Appl. No. 14/942,503, May 31, 2017, Office Action.
U.S. Appl. No. 14/937,619, Sep. 8, 2017, Office Action.
U.S. Appl. No. 14/937,619, Feb. 7, 2018, Notice of Allowance.
U.S. Appl. No. 14/942,503, Feb. 20, 2018, Office Action.
U.S. Appl. No. 14/937,577, Sep. 14, 2018, Preinterview 1st QA.
U.S. Appl. No. 14/937,577, Nov. 5, 2018, Office Action.
U.S. Appl. No. 14/948,503, Sep. 7, 2018, Office Action.

* cited by examiner

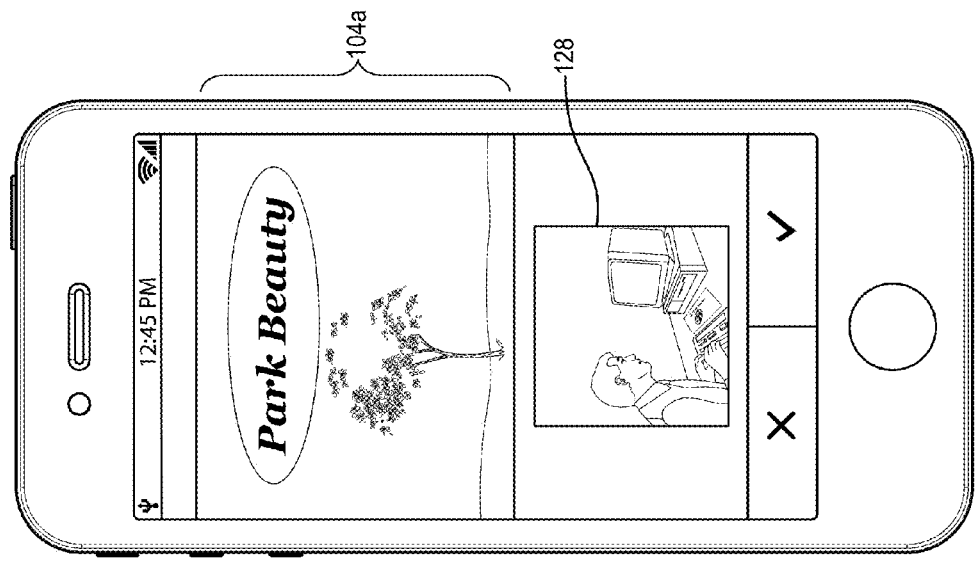
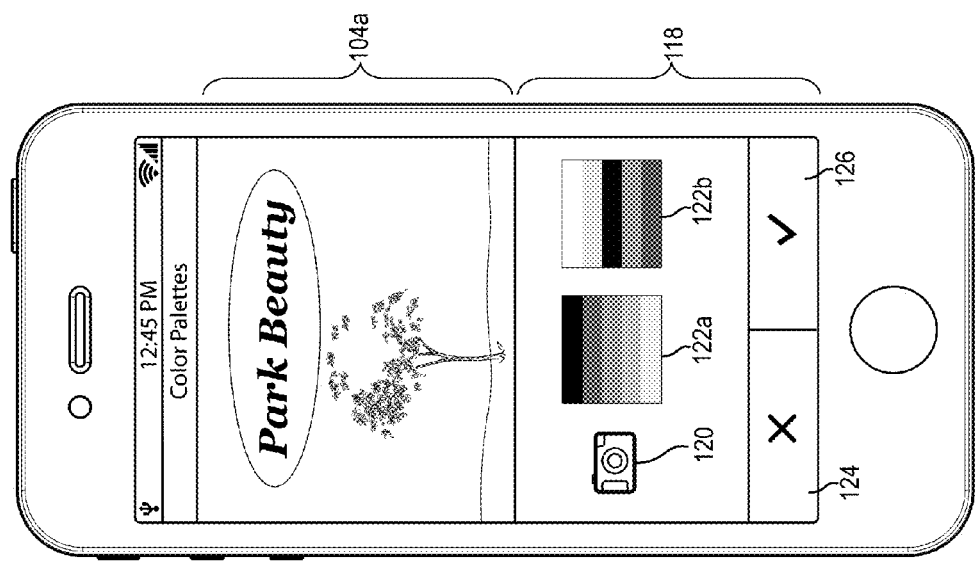
Fig. 1D
Fig. 1C

APPLYING LIVE CAMERA COLORS TO A DIGITAL DESIGN

CROSS REFERENCE TO RELATED APPLICATIONS

This application claims the benefit of and priority to U.S. Provisional Application No. 62/198,537, filed Jul. 29, 2015, the entire contents of which are hereby incorporated by reference.

BACKGROUND

1. Technical Field

One or more embodiments of the present disclosure relate generally to digital media. More specifically, one or more embodiments of the present disclosure relate to creating and editing digital media.

2. Background and Relevant Art

Users generally spend many hours online every day. For example, a user may read social media posts and news articles online, purchase goods through retail websites online, compose emails and blog posts online, plan vacations online, perform work tasks online, and so forth. It is not surprising that, in light of how much time users spend online, providers of web content typically put great effort into creating web content that quickly draws user's attention. For instance, a marketer may put a lot of time and work into designing an advertisement campaign that is professional and eye-catching and that will cause online users to become interested in the campaign.

Thus, it is important for a content provider to draw online user's attention in order to entice online users into clicking a hyperlink, viewing an advertisement, providing a response, purchasing a good, etc. Problems arise, however, for many content providers who are not trained or experienced in creating professional and eye-catching digital media. For example, a content provider may wish to design a digital image that includes the same colors as a view that the content provider is currently experiencing (e.g., a beautiful sunset, a serene lake, etc.), but does not have the design experience to do so.

Furthermore, while various types of software exist that facilitate a user editing digital media, these software packages are generally bulky and require a substantial amount of processing power and memory from the computing device on which the software is running. Thus, in order to successfully edit digital images, a user generally utilizes a larger computing device, such as a laptop or desktop computer. Additionally, digital editing software run on a larger computer device typically allows the use of additional peripherals, such as a keyboard, a computer mouse, a stylus, etc. Accordingly, conventional system provide users little recourse when faced with a need or desire to create or edit digital images "on-the-go" utilizing a handheld device (e.g., a smart phone, tablet, smart wearable) using only an associated touch screen.

Thus, there are several disadvantages to current methods for creating and editing digital media.

SUMMARY

One or more embodiments described herein provide benefits and/or solve one or more of the foregoing or other problems in the art with systems and methods that provide users with efficient and effective user experiences in creating or editing digital media. For example, one or more embodiments include systems and methods that enable a user to extract colors from a captured live camera feed and apply those extracted colors to an input digital design. Accordingly, the user can produce an eye-catching and aesthetically pleasing design without any hassle or wasting time.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 1A-1F illustrate a series of graphical user interfaces in connection with the digital content creation/editing system that illustrate extraction of dominant colors from a live camera feed and application of the extracted colors to an input digital design in real time in accordance with one or more embodiments;

DETAILED DESCRIPTION

Figure 1B:
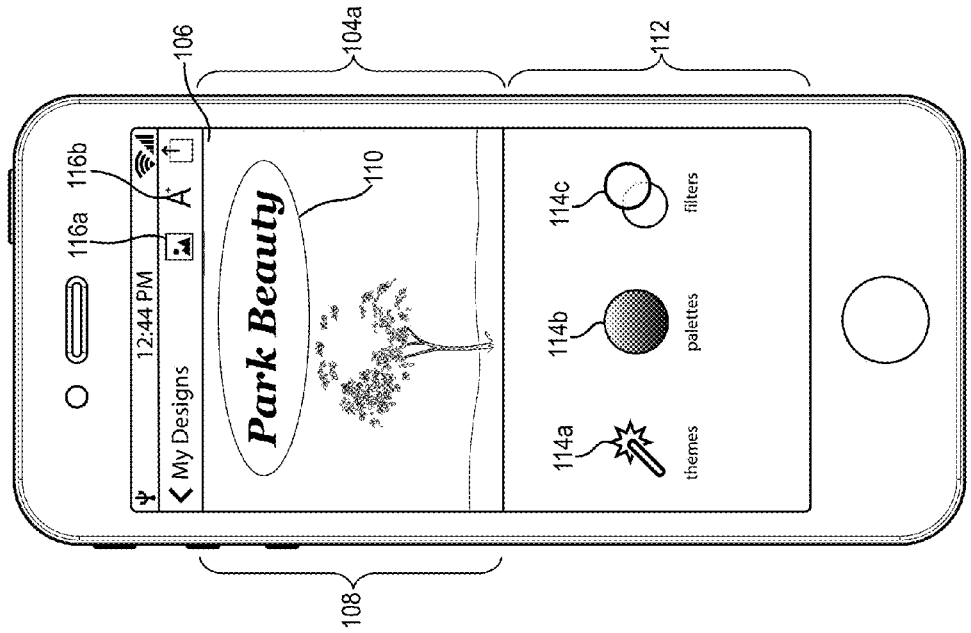

One or more embodiments described herein include a digital content creation/editing system that enables a user to easily create professional and aesthetically pleasing digital media. Specifically, the digital content creation/editing system extracts a color palette from a live camera feed. Furthermore, the digital content creation/editing system applies the extracted color palette to a user's input digital design in real time. Thus, the digital content creation/editing system enables the user to apply a color palette to an input digital design that is representative of what the user is looking at in real time.

To illustrate, the digital content creation/editing system extracts a color palette from a live camera feed of a handheld device. In one or more embodiments, the digital content creation/editing system identifies the most used and/or visually distinctive colors present in the live camera feed. The digital content creation/editing system further constructs a color palette based on the identified colors. The digital content creation/editing system then applies the extracted color palette to the user's input digital design.

As used herein, an "input digital design" refers to any type of digital media or multimedia image. For example, an input digital design includes, but is not limited to, digital photographs, digital video, computer generated imagery, "GIFs," "JPEGs," "PDFs," etc. In one or more embodiments, an input digital design is any type of computer readable media that is capable of being digital edited. Generally, an input digital design includes an underlying image and an overlay.

As used herein, an "underlying image" refers to an image that serves as the background of an input digital design. For example, an underlying image associated with an input digital design includes any variation of shapes, colors, people, landmarks, interiors, exteriors, and so forth. The underlying image associated with an input digital design is generally taken from an input file (e.g., a JPEG file, GIF file, a PNG file, a PDF file, a raw digital photograph file, etc.). Other examples of an underlying image are animations, illustrations, or other digital content. Still another example of an underlying image is a frame of a video.

As used herein, an "overlay" refers to an image or design element that serves as the foreground of an input digital design. For example, one type of overlay is a textual overlay. A textual overlay includes text, and in some cases, a backing shape or border. An overlay can have variable opacity such that, when in combination with an underlying image, part of the underlying image is viewable through the overlay. Together, the underlying image and the overlay serve to create a rich input digital design wherein the content of the overlay is highlighted by the content of the underlying image.

Also as used herein, a "page item" refers to any item or object that makes up any part of the user's input digital design. For example, a page item can include an underlying image, an overlay, or any item or object in the underlying image or overlay. Thus, a page item can be an object depicted in an underlying image, text included in an overlay, etc.

Additionally, as used herein, a "live camera feed" refers to a live data stream being captured by a camera associated with a computing device. For example, a smart phone is a handheld computing device that typically includes a camera. In response to a user selecting a record button, the smart phone captures a live camera feed as a recorded video. Similarly, in response to a user selecting a shutter button, the smart phone captures a smaller portion (e.g., a few milliseconds) of a live camera feed as a photograph. In one or more embodiments, a live camera feed is made of captured still images (e.g., photographs) that are taken in quick succession. In one or more embodiments, a user can view the live camera feed through a camera viewfinder also associated with the computing device.

Furthermore, as used herein, a "color palette" refers to a collection of colors. In one or more embodiments, the digital content creation/editing system generates a color palette based on known design principles such that the colors within the palette work well with each other. A color palette can be a single color, but is more commonly five to twelve colors.

In one or more embodiments, the digital content creation/editing system presents series of graphical user interfaces ("GUIs" or "user interfaces") that enable a user to edit and/or create digital images. The digital content creation/editing system provides the user interfaces on the display of a handheld device. As used herein, the term "handheld device" refers to a device sized and configured to be held in a single hand of a user (e.g., a mobile phone or smart phone, a personal digital assistant, a tablet computer, a smart wearable). Alternatively, however, the digital content creation/editing system can present graphical user interfaces on any other suitable computing device such as, but not limited to, a larger wireless device, a laptop or desktop computer, and/or any other suitable computing device.

The process by which the digital content creation/editing system extracts color from a live camera feed and applies the extracted color to a user's input digital design will now be described with reference to a series of user interfaces in FIGS. 1A-1F. It will be understood that the digital content creation/editing system displays the user interfaces illustrated in FIGS. 1A-1F on the touch screen of a client-computing device such as a smart phone, tablet, smart wearable, etc. Furthermore, FIGS. 1A-1F and the related description reference creation and modification of digital designs comprising an underlying image and an overlay. One will appreciate that in alternative embodiments, the digital designs can comprise videos, animations, illustrations, or other digital content in addition to, or in place of, a digital image. Thus, the reference to a digital image below is to aid in explaining the various embodiments and should not be considered limiting.

Figure 1A:
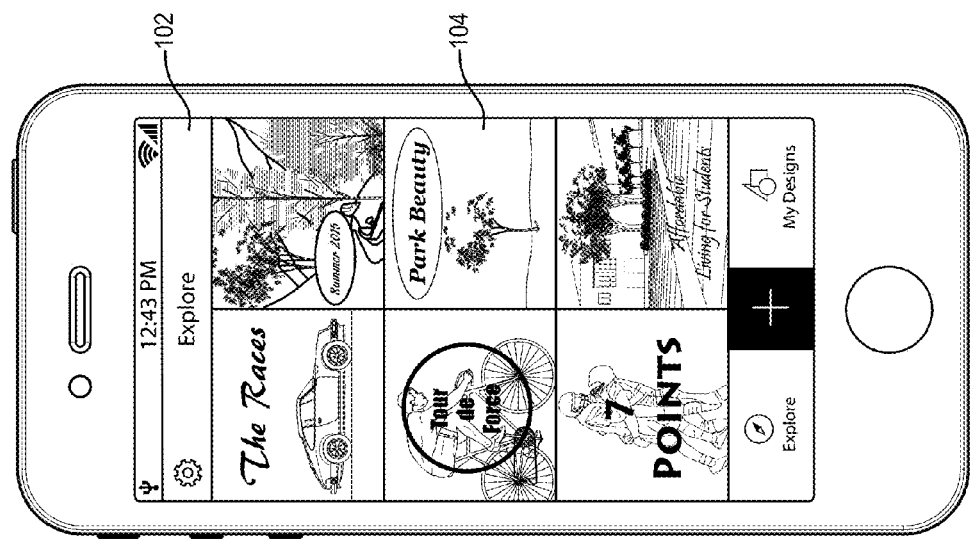

For example, as shown in FIG. 1A, a user begins the process of creating a digital design by selecting a digital design 104 from the image gallery GUI 102. In one or more embodiments, the image gallery GUI 102 includes a variety of existing design or images (e.g., provided by the digital content creation/editing system, provided by a community of users of the digital content creation/editing system, or previous designs/images stored by the user) that the user can select for editing in order to create a new digital design. Each of the existing designs generally includes a combination of images and text, as well as other style elements (e.g., backing shapes, overlays, etc.). As will be further described below, in alternative or additional embodiments, rather than selecting an existing design to edit, the user can create a new design that is not based on any existing image or previous design.

In response to selecting the digital design 104 from the image gallery GUI 102, as shown in FIG. 1A, the digital content creation/editing system provides an editable digital design 104a in an editing GUI 106, as shown in FIG. 1B. Because the existing images shown in the image gallery GUI 102 are available to all users of the digital content creation/editing system, in at least one embodiment, the digital content creation/editing system treats a selected existing image as a template. Thus, the digital content creation/editing system creates a digital design that is a copy of the selected existing design so that a user can edit the copy of the existing design rather than editing the original existing design.

For example, as shown in FIG. 1B, the digital content creation/editing system provides the editable digital design 104a within the editing GUI 106. As discussed above, the editable digital design 104a includes an underlying image 108 (e.g., a tree in a park) that serves as a background for an overlay 110 (e.g., "Park Beauty" within an oval backing shape). The backing shape of the overlay 110 is completely opaque and as such blocks out the portions of the underlying image 108 behind the overlay 110. In alternative embodiments, the overlay 110 may be more transparent so as to allow portion of the underlying image 108 behind the overlay 110 to be viewed.

As further shown in FIG. 1B, the editing GUI 106 also includes an editing control palette 112 with one or more editing controls 114a-114c that enable the user to edit various elements associated with the editable digital design 104a. For example, in response to the user selecting the editing control 114a, the digital content creation/editing system provides the user with automatically generated themes that can be applied to the editable digital design 104a. In response to the user selecting the editing control 114b, the digital content creation/editing system provides the user with various color palettes that can be applied to the editable digital design 104a. In response to the user selecting the editing control 114c, the digital content creation/editing system provides the user with various filters that can be applied to the editable digital design 104a.

While the editing control palette includes controls that allow the user to edit both the overlay 110 and the underlying image 108 together, the editing GUI 106 further includes controls that enable the user to edit the overlay 110 and the underlying image 108 separately. For example, the digital design control 116a enables the user to edit or replace the underlying image 108. Similarly, the digital design control 116b enables the user to edit or replace the overlay 110.

In order to extract one or more colors from a live camera feed, the user first selects the editing control 114b. For example, in response to the user selecting the editing color 114b, the digital content creation/editing system replaces the editing control palette 112 with the color control palette 118, as shown in FIG. 1C. In one or more embodiment, the color control palette 118 includes a camera viewfinder control 120 and one or more preselected color palette controls 122a, 122b. In at least one embodiment, the color control palette 118 is a side-scrolling control and includes additional preselected color palette controls. It will be understood that the exit control 124 and the save control 126 serve to enable the user to either exit out of the color control palette 118 or to save any edits added to the input digital design 104a.

In response to the user selecting the camera viewfinder control 120, the digital content creation/editing system accesses a camera of the user's client-computing device to provide a camera viewfinder through which the user can see what the camera of user's client-computing device is currently targeting. For example, in response to the user selecting the camera viewfinder control 120, the digital content creation/editing system swaps the color control palette 118 for the camera viewfinder 128, as illustrated in FIG. 1D. The image displayed in the camera viewfinder 128 includes a live camera stream of a view of what the camera of the user's client-computing device is currently targeting (e.g., a man sitting at a computer looking at a chart on a piece of paper in front of him). If the user continues to hold the client-computing device still such that the camera viewfinder 128 remains targeted at the current fixed position for a threshold amount of time, the digital content creation/editing system will begin the process of extracting one or more colors from the live camera stream represented by the camera viewfinder 128.

Figure 1F:
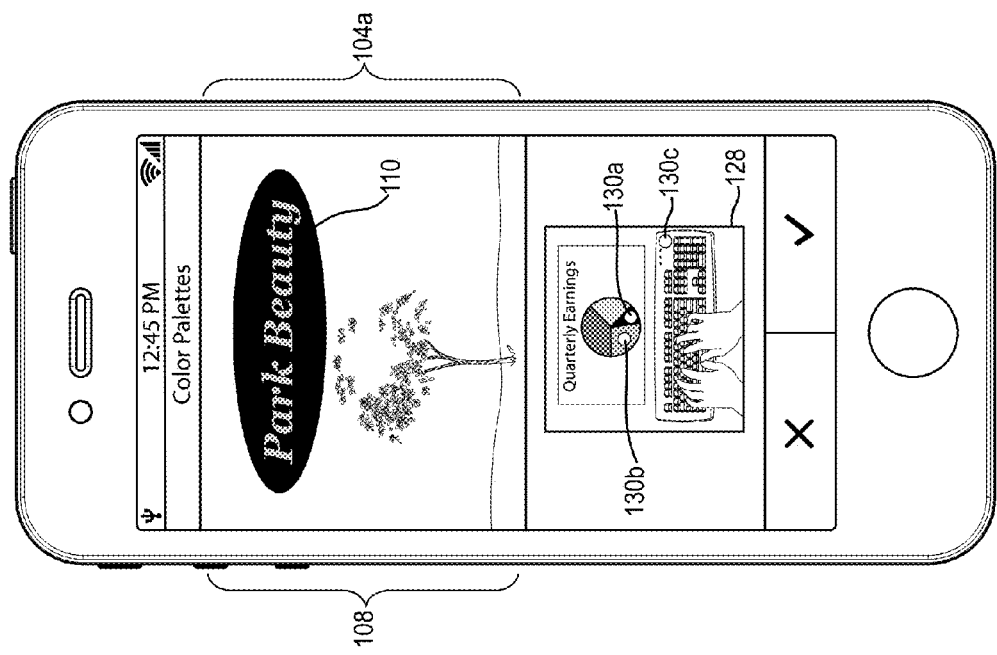
Figure 1E:
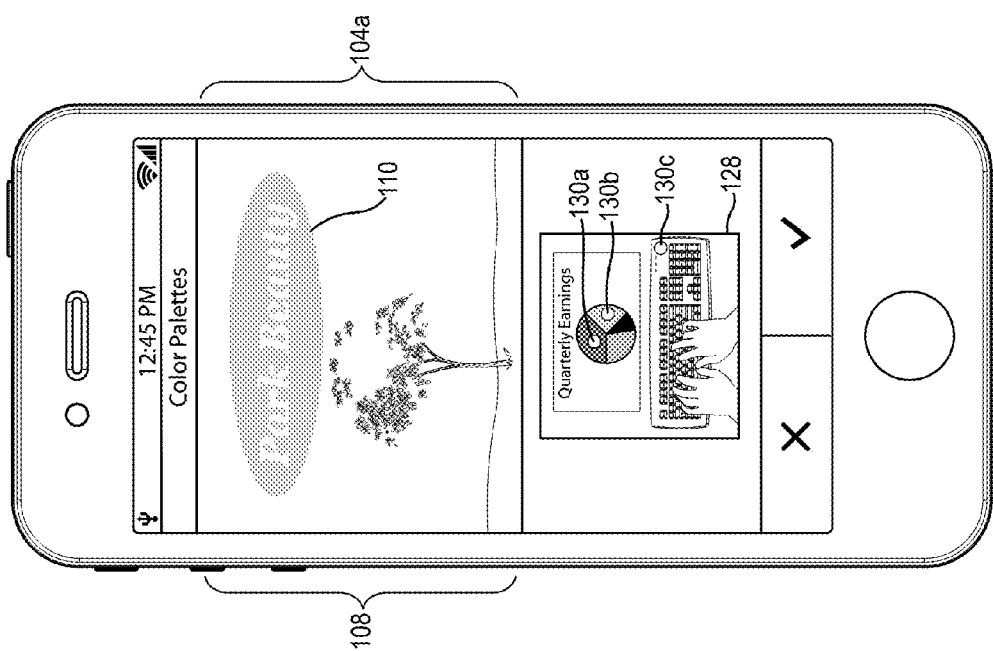

If, however, the user moves the camera to be directed at something else, the digital content creation/editing system will continue determining whether the camera viewfinder 128 has been directed at a fixed position for the threshold amount of time. For example, as shown in FIG. 1E, in response to the user changing the fixed position at which the camera viewfinder 128 is targeted (e.g., the camera viewfinder 128 is now directed at only the man's hands, keyboard, and piece of paper illustrating a quarterly earnings chart) and holding the client-computing device still for the threshold amount of time, the digital content creation/editing system will begin the process of extracting one or more colors from the live camera feed illustrated by the camera viewfinder 128. It will be understood with regard to the process of extracting one or more colors from the live camera feed that from the user's perspective, the extraction process is largely instantaneous. For example, in one embodiment, the threshold amount of time during which the user must hold client-computing device still is so short that the user would not perceive that any time had passed at all. Thus, as the user moves the client-computing device so as to target various scenes through the camera viewfinder 128, it would seem to the user that the digital content creation/editing system automatically and instantly extracts colors from the live camera feed.

In one or more embodiments, a live camera feed from the camera of a client-computing device typically consists of a series of images captured by the camera in quick succession (e.g., captured milliseconds apart). Accordingly, in order to determine that the user desires to extract a color palette from the live camera feed, the digital content creation/editing system compares two or more of the series of images captured by the camera. For example, the digital content creation/editing system compares a newly captured image to an image previously captured (e.g., captured at the current time minus the threshold amount of time).

The digital content creation/editing system compares the two captured images to determine a level of similarly. For example, the digital content creation/editing system accepts some variance between the two images to account for hand-shaking and other body movements of the user holding the client-computing device. Larger differences between the two images (e.g., the addition of a new object in one image, the subtraction of an object from one image, etc.), however, indicate to the digital content creation/editing system that the camera of the computing device has not remained targeted at the fixed position for long enough to indicate that the user of the computing device desires to extract a color palette from the live camera feed of the camera of the computing device. In response to determining that the camera viewfinder of a computing device has remained targeted at the fixed position for the threshold amount of time, the digital content creation/editing system extracts one or more colors from the live camera feed of the computing device. As mentioned above, the live camera feed typically consists of a series of images captured by the camera in quick succession (e.g., captured milliseconds apart). Accordingly, the digital content creation/editing system extracts one or more colors from the live camera feed by extracting one or more colors from a representative image (e.g., an image of the fixed position) captured by the camera during the threshold amount of time that the camera viewfinder remained targeted at the fixed position. Alternatively, rather than waiting for the threshold amount of time to pass, the user can select a color palette capture control to cause the digital content creation/editing system to being the color extraction process.

After the digital content creation/editing system extracts one or more colors from the live camera feed shown in the camera viewfinder 128, the digital content creation/editing system creates a color palette representative of the extracted colors and provides the user with one or more color indicators 130a, 130b, and 130c indicating the colors extracted from the live camera feed. Additionally, the digital content creation/editing system positions the color indicators 130a, 130b, and 103c in the live camera feed within the camera viewfinder 128 to indicate where the corresponding colors exist in the live camera feed.

In one or more embodiments, the color indicators 130a-130c are editable, such that a user's can move one or more of the color indicators 130a-130c within the live camera feed shown by camera viewfinder 128. For example, in response to the user moving the color indicator 130a within the live camera feed (e.g., via a touch gesture, or any other type of input), the digital content creation/editing system updates the created color palette representative of the extracted colors and reapplies the updated color to the input digital design 104a. In one or more embodiments, the digital content creation/editing system re-maps the color in the input digital image 104a that was previously mapped to the original placement of the color indicator 130a to the color now indicated by the shifted color indicator 130a (e.g., changing the color of the backing shape of the overlay 110). Similarly, in one or more embodiments, the digital content creation/editing system re-maps the color in the input digital image 104a that was previously mapped to the original place of the color indicator 130b to the color now indicated by the shifted color indicator 130b (e.g., changing the color of the text of the overlay 110).

Each time the digital content creation/editing system retargets colors within the live camera feed in order to extract colors, the digital content creation/editing system updates the positions of the one or more color indicators 130a-130c. In one or more embodiments, the digital content creation/editing system adds effects to the repositioning of the color indicators 130a-130c, such that the repositioning of the color indicators 130a-130c is more noticeable. For example, the digital content creation/editing system can add an animation to the repositioning of the color indicators 130a-130c such that they fade-out from one position to fade-in at an updated location, or such that they glide from one position to another updated location, etc.

Additionally, the digital content creation/editing system applies the extracted colors from the live camera feed to the input digital design 104a. For example, through an application process described in greater detail below, the digital content creation/editing system maps one or more colors in the input digital design 104a to the extracted colors from the live camera feed as indicated by the color indicators 130a, 130b, and 130c. As shown in FIG. 1E, the digital content creation/editing system has mapped the color indicated by the color indicator 130a to the backing shape of the overlay 110. Similarly as shown in FIG. 1E, the digital content creation/editing system has mapped the color indicated by the color indicator 130b to the text in the overlay 110, and the color indicated by the color indicator 130c to the sky in the underlying image 108.

As mentioned above, the digital content creation/editing system automatically updates the input digital design 104a based on the extracted colors from the live camera feed. For example, in one or more embodiments, each time the digital content creation/editing system positions or repositions the one or more color indicators 130a-130c, the digital content creation/editing system updates the input digital design 104a based on the extracted colors represented by the one or more color indicators 130a-130c. Thus, the user can see in real-time how the extracted colors from the live camera feed affect the look and feel of the input digital design 104a.

In one or more embodiments, the update to the input digital design 104a performed by the digital content creation/editing system is applied in real-time. For example, the digital content creation/editing system extracts colors from a live camera feed and applies those colors to the input digital design 104a so quickly that from the user's perspective, little or no time elapses between when the user targets a particular scene with the camera viewfinder 128 and the digital content creation/editing system updates the input digital design 104a.

As discussed above with regard to FIGS. 1A-1F, the digital content creation/editing system extracts a color palette from a live camera feed and applies the extracted color palette to a user's input digital design. In order to extract colors from a captured image, the digital content creation/editing system performs a color analysis on the representative image captured by the camera. For example, in order to perform the color analysis on the representative image, the digital content creation/editing system identifies all colors in the representative image by moving through the representative image pixel by pixel. For each pixel, if the color of that pixel has not been previously identified, the digital content creation/editing system identifies the color and notes that one pixel exists in the representative image with the identified color. If the color of that pixel has been previously identified, the digital content creation/editing system adds one to the number of identified pixels in the representative image with that color. Thus, after analyzing the representative image, the digital content creation/editing system has a list of colors, each color associated with a number of pixels in the representative image that are that color.

In additional or alternative embodiments, the digital content creation/editing system combines similar colors. For example, the representative image may contain an image of a grassy hill with many similar shades of green. In that case, during the color analysis, the digital content creation/editing system can identify a particular color and determine that the identified color is within a threshold level of similarity with a previously identified color. Accordingly, the digital content creation/editing system will add one to the number of identified pixels associated with the previously identified color.

Furthermore, in alternative embodiments, the digital content creation/editing system performs the color analysis on areas within the representative image, rather than in a pixel-by-pixel manner. For example, in one embodiment, the digital content creation/editing system identifies a main focus of the representative image (e.g., an object positioned in the middle of the representative image) and performs the color analysis only on the area taken up by the main focus of the representative image. Methods for determining color density through color analysis of a representative image are further discussed in U.S. Pat. No. 8,041,111, issued Oct. 18, 2011, which is incorporated herein by reference.

After extracting colors from the representative image, the digital content creation/editing system creates a color palette based on the extracted colors. In one or more embodiments, the digital content creation/editing system creates the color palette based on the most dominant (i.e., most used) colors identified within the representative image. Accordingly, in order to determine the most predominant colors, the digital content creation/editing system assigns a score to each identified color from the representative image that is based on a percentage of the representative image that is taken up by the identified color.

As described above, during the color analysis of the representative image, the digital content creation/editing system identifies all colors in the representative image as well as a number of pixels that display each identified color. Accordingly, the digital content creation/editing system determines the percentage of the representative image that is taken up by a particular color by simply dividing the number of pixels associated with that particular color into the total number of pixels in the representative image. After performing this calculation for each identified color in the representative image, the digital content creation/editing system assigns a score for each identified color based on its calculated percentage. In at least one embodiment, the digital content creation/editing system assigns a higher score to an identified color that has a larger calculated percentage, and vice versa.

In one or more embodiments, the digital content creation/editing system creates a color palette by identifying a given number of the highest scoring colors from the representative image. For example, the digital content creation/editing system can create the color palette of the top five highest scoring colors. In at least one embodiment, the number of colors included in the color palette can be a user-configurable number.

In at least one embodiment, the digital content creation/editing system takes general design principles into account when creating the color palette. For example, in some embodiments, the top five highest scoring colors from the representative image may include a subset of color that do not fit within general design principles (e.g., the colors clash). Accordingly, in that case, the digital content creation/editing system may substitute the clashing colors in the color palette with other colors that are better suited for inclusion in the palette.

In at least one embodiment, the digital content creation/editing system also identifies "eye-catching" colors that may not cover a statistically significant portion of the representative image. For example, if the representative image is of a sunset on the beach, the most statistically significant colors may include pinks, oranges, blues, and purples. The bright yellow of the sun may not be statistically significant because it only covers a very small portion of the representative image. In at least one embodiment, due to the brightness and saturation of the bright yellow color of the sun, the digital content creation/editing system will extract the bright yellow color for use in the extracted color palette because it is an "eye-catching" color.

After the digital content creation/editing system has built a color palette based on extracted colors from the representative image, the digital content creation/editing system applies the color palette to an input digital design in real time. In order to apply the color palette to the input digital design, the digital content creation/editing system first determines how to map the color palette onto the input digital design. For example, in one embodiment, the digital content creation/editing system determines how to map the color palette onto the input digital design by performing a color analysis on the input digital design similar to that described above. In other words, the digital content creation/editing system identifies all colors in the input digital design and the percentage of the input digital design that is taken up by each identified color. Accordingly, the digital content creation/editing system then maps colors in the color palette onto the input digital design by swapping out a color in the input digital design with a color from the color palette that has a similar score.

Alternatively, the digital content creation/editing system applies the color palette to the input digital design by identifying dominant page items within the input digital design and mapping one or more colors in the color palette to the dominant page items. For example, in one embodiment, the input digital design includes an underlying image with a single main object (e.g., a green Christmas tree), and an overlay with a red backing shape and white text). Accordingly, in that embodiment, the digital content creation/editing system will apply the color palette to the Christmas tree, the backing shape, and the text, even if the input digital design includes other colors that are more dominant than those included in those main objects or items.

Alternatively, the digital content creation/editing system can map colors from the live color palette to the image using mapping rules. For example, the digital content creation/editing system can identify colors in an image that are a shade of a color in the live color palette or vice versa. In such instances the digital content creation/editing system can modify the image by switching colors in the image that are a shade of a color from the live color palette with the color from the live color palette. In other embodiments, the digital content creation/editing system switches colors in the image with a complementary color from the live color palette. In still further embodiments, the digital content creation/editing system switches colors in the image with an analogous color from the live color palette. In other embodiments, the digital content creation/editing system will apply color extracted from the live camera feed to the input digital design 104a according to established and well known design principles (e.g., darker colors applied to a background, lighter colors applied to a foreground, etc.) as dictated by various rules, grammars, etc.

In alternative embodiments, the digital content creation/editing system applies dominant extracted colors in other ways. For example, in one embodiment, the digital content creation/editing system applies dominant extracted colors only to the overlay 110 of the input digital design 104a. Similarly, in another embodiment, the digital content creation/editing system applies dominant extracted colors only to the underlying image 108.

In some embodiments, if the extracted color palette includes an "eye-catching" color that is not statistically significant, the digital content creation/editing system applies the extracted color palette to the input digital design in a different way. For example, in that case, the digital content creation/editing system can utilize the statistically significant extracted colors as a filter on the input digital design, while applying the "eye-catching" color only to text identified within the input digital design.

Furthermore, in at least one embodiment, the digital content creation/editing system applies extracted colors across similar page items between the representative image and the input digital design. For example, in one embodiment, the digital content creation/editing system utilizes recognition algorithms to determine that the representative image includes text. In that case, the digital content creation/editing system applies the color extracted from the text in the representative image to text in the input digital design. Similarly, if the representative image includes trees with fall foliage, the digital content creation/editing system will apply the color extracted from the trees in the representative image to any identified trees in the input digital design, and so forth.

Additionally, the digital content creation/editing system further utilizes recognition algorithms to identify known objects within the input digital design (e.g., faces, animals, etc.). In response to identifying known objects within the input digital design, the digital content creation/editing system can avoid applying inappropriate colors to those known objects. For example, if the digital content creation/editing system identifies one or more faces in the input digital design, and the extracted color palette includes various shades of blue, the digital content creation/editing system can determine via one or more of rules, grammars, databases, Internet searches, etc. that the extracted dominant colors are inappropriate for application to the identified one or more faces. Alternatively, the digital content creation/editing system can apply a filter to the extracted dominant colors prior to application to the input digital design such that the extracted dominant colors are less saturated. In at least one embodiment, the digital content creation/editing system can also utilize machine learning to determine, over time, whether the user would want a traditionally inappropriate extracted color to a particular known object (e.g., the user may what to create a certain effect by applying a blue color to a face in the input digital design).

In at least one embodiment, the digital content creation/editing system uses added intelligence in applying dominant extracted colors to the input digital design 104a. For example, if the underlying image 108 of an input digital design 104a contains a scene from nature (e.g., blue sky, grey ocean, green grass, etc.), and the live camera feed contains dominant colors that are garish and bright (e.g., neon colors), the digital content creation/editing system will only apply color extracted from the live camera feed to an overlay 110 of the input digital design 104a so as not to create an unnatural looking underlying image 108. In one or more embodiments, the digital content creation/editing system bases this added intelligence on image comparison algorithms that assist in the determination of whether an input digital design 104a includes known objects (e.g., human faces, grass, sky, etc.) based on a comparison between the input digital design 104a using image recognition algorithms, such as a facial detection software.

After the digital content creation/editing system applies the color palette to the input digital design, the digital content creation/editing system further corrects the input digital design in order to preserve legibility and contrast in the input digital design. For example, in one or more embodiments, the digital content creation/editing system places particular importance on maintaining the legibility of any text included in the input digital design. Accordingly, after the digital content creation/editing system applies the color palette to the input digital design, the digital content creation/editing system analyzes the resulting input digital design for legibility text and contrast between various objects and items included in the input digital design. If any of the applied colors from the color palette have caused a loss of legibility and/or contrast, the digital content creation/editing system corrects the colors (e.g., makes a color brighter, adjusts color hue, color shade, color saturation, color opacity, etc.).

As described above with reference to FIGS. 1E and 1F, the digital content creation/editing system provides one or more color indicators associated with the video viewfinder that indicate the dominant colors in the live camera feed. Also as described above, in at least one embodiment, the digital content creation/editing system enables the user to interact with one or more of the color indicators such that the user can manually alter the color palette. For example, in response to the user interacting with a color indicator (e.g., via a touch-and-slid touch gesture, or a drag touch gesture), the digital content creation/editing system registers an alteration to the color palette by determining the original color in the color palette associated with the color indicator with which the user is interacting. Next, the digital content creation/editing system identifies the new color in the live video now being indicated by the color indicator and replaces original color in the input digital design with the new color.

As discussed above, the extraction of colors from the live camera feed and the creation and application of the color palette occur in real-time. Accordingly, as the user retargets the camera viewfinder of the client-computing device to a fixed position, the digital content creation/editing system automatically restarts the processes described above and extracts new colors from the live camera feed, creates a new color palette, and applies the new color palette to the input digital design. Thus, the user simply has to point the camera at the client-computing device at different scenes until the digital content creation/editing system applies a color palette to the input digital design that the user likes.

Figure 2B:
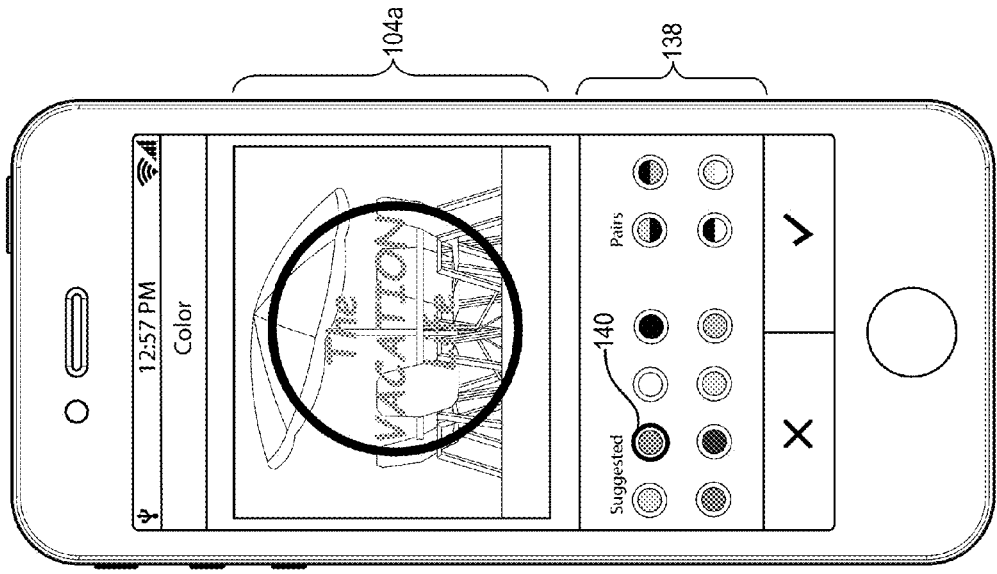
FIGS. 2A-2D illustrate another series of graphical user interfaces in connection with the digital content creation/editing system that allow for modification of digital designs in accordance with one or more embodiments.
Figure 2A:
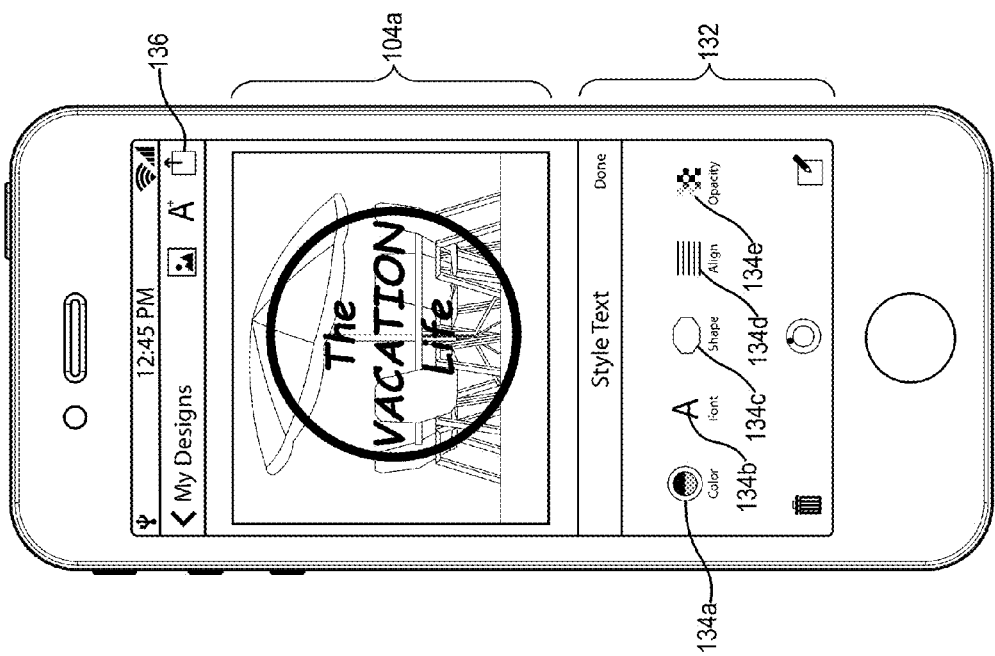

In additional or alternative embodiments, rather than automatically placing and otherwise altering a textual overlay, the digital content creation/editing system enables additional controls that allow the user to manually edit the input digital design 104a. For example, the digital content creation/editing system provides the manual control palette 132, as shown in FIG. 2A. In one or more embodiments, the manual control palette 132 includes a color control 134a, a font control 134b, a backing control 134c, an alignment control 134d, and an opacity control 134d.

In response to selecting the color selection control 134a, as shown in FIG. 2A, the user can manually edit color within the input digital design 104a. In one or more embodiments, in response to the user selecting the color selection control 134a, the digital content creation/editing system can provide the color palette 138, as shown in FIG. 2B. For example, the color palette 138 includes various color options that the digital content creation/editing system applies to the input digital design 104a (e.g., the digital content creation/editing system may present all available colors within the color palette 138, or may only present colors that will likely be aesthetically pleasing within the input digital design 104a). In some embodiments, the digital content creation/editing system applies a selected color 140 to only the text within the input digital design 104a. In other embodiments, the digital content creation/editing system applies the selected color 140 to a portion of the input digital design 104a indicated by the user. In at least one embodiment, in response to the user tapping the selected color 140, the digital content creation/editing system provides previews of the selected color 140 in association with the input digital design 104a.

Figure 2C:
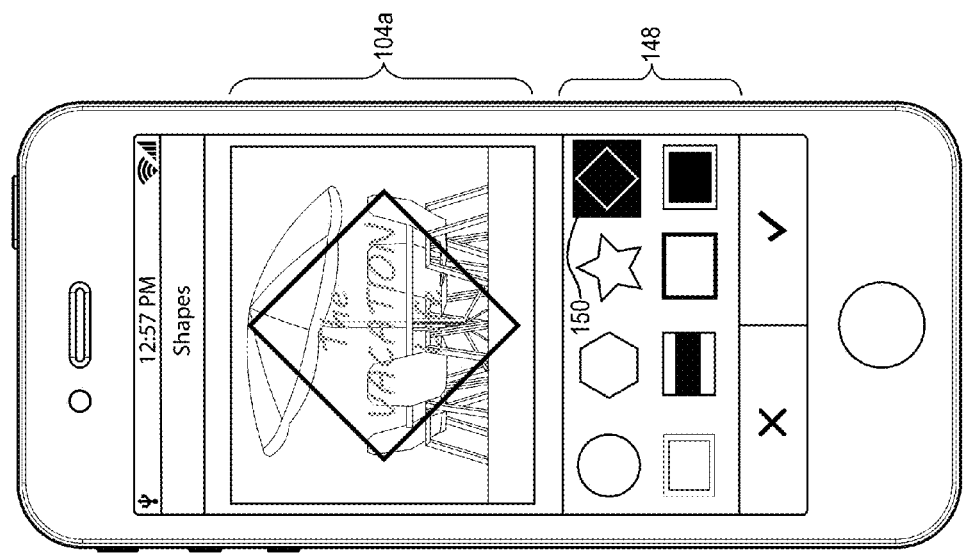

In order to manually edit the fonts shown in the input digital design 104a, the user can select the font control 134b, as shown in FIG. 2A. For example, in response to the user selecting the font control 134b, as shown in FIG. 2A, the digital content creation/editing system provides the font palette 142, as shown in FIG. 2C. In one or more embodiments, the font palette 142 includes various fonts available for application to the input digital design 104a. In response to the user tapping the selected font 146, the digital content creation/editing system applies the selected font 146 to the input digital design 104*a*.

Figure 2D:
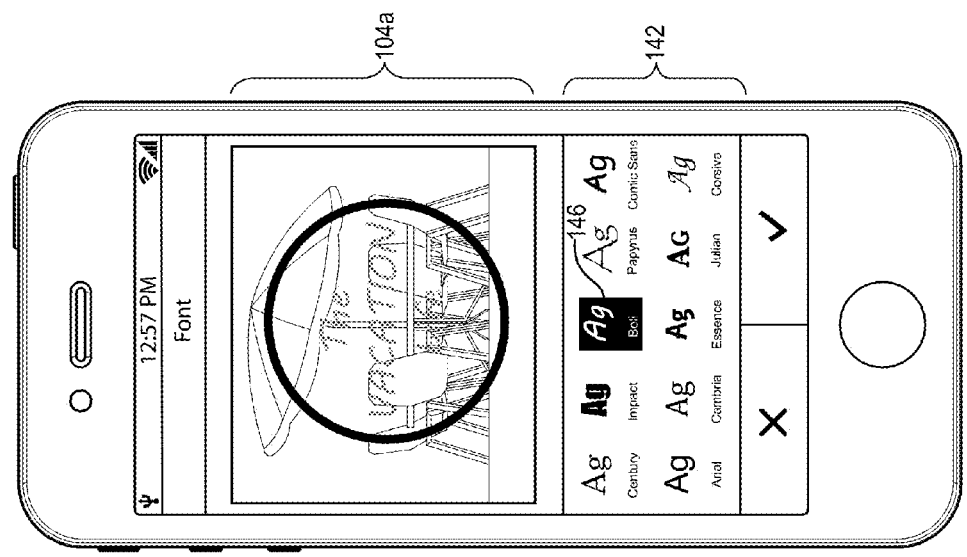

In order to manually change the backing shape shown in the input digital design 104*a*, the user can select the backing control 134*c*, as shown in FIG. 2A. In response to the user selecting the backing control 134*c*, as shown in FIG. 2A, the digital content creation/editing system can provide the backing shape palette 148, as shown in FIG. 2D. In one or more embodiments, the backing shape palette 148 includes a variety of backing shape elements that the user can select. In response to the user selecting the backing shape 150, the digital content creation/editing system can apply the shape illustrated by the backing shape 150 to the input digital design 104*a*. In one or more embodiments, the digital content creation/editing system can automatically alter various features or characteristics of the displayed text within the input digital design 104*a* in order for the displayed text to function cohesively with the selected backing shape. For example, in order to apply the shape illustrated by the backing shape 150 to the input digital design 104*a*, the digital content creation/editing system can alter the size, font, color, placement, and opacity of the text within the input digital design 104*a*, such that the text is viewable against the selected backing shape.

Furthermore, the user can manually alter the alignment of the text within the input digital design 104*a*. In one or more embodiments, in response to the user selecting the alignment control 134*d*, as shown in FIG. 2A, the digital content creation/editing system can alter the alignment of the text displayed in the input digital design 104*a*. For example, the digital content creation/editing system can cause the alignment of the text to become center-aligned, right-justified, left-justified, etc. In at least one embodiment, the digital content creation/editing system can cycle through different text alignments in response to the user repeatedly selecting the alignment control 134*d*.

Additionally, the user can manually alter the opacity of the text, or other selected elements, within the input digital design 104*a*. In one or more embodiments, in response to the user selecting the opacity control 134*e*, as shown in FIG. 2A, the digital content creation/editing system changes the opacity of one or more elements within the input digital design 104*a*. For example, the digital content creation/editing system can change the opacity of the text within the input digital design 104*a* to become more or less opaque. In at least one embodiment, the digital content creation/editing system cycles through various levels of opacity in response to the user repeatedly selecting the opacity control 134*e*. Alternatively, the digital content creation/editing system provides a slider control in order for the user to select an opacity level in relation to the input digital design 104*a*.

Once the user is satisfied with the look and feel of the input digital design 104*a*, the user can share and/or store the input digital design 104*a*. In one or more embodiments, in response to the user selecting the sharing control 136, as shown in FIG. 2A, the digital content creation/editing system provides various sharing options. By utilizing the various controls provided, the user can upload the input digital design 104*a* to various social media channels, save the input digital design 104*a* locally or remotely, print the input digital design 104*a*, etc. In at least one embodiment, the digital content creation/editing system automatically saves the input digital design 104*a* at regular intervals in order to save the user from accidentally loosing edits.

Figure 3:
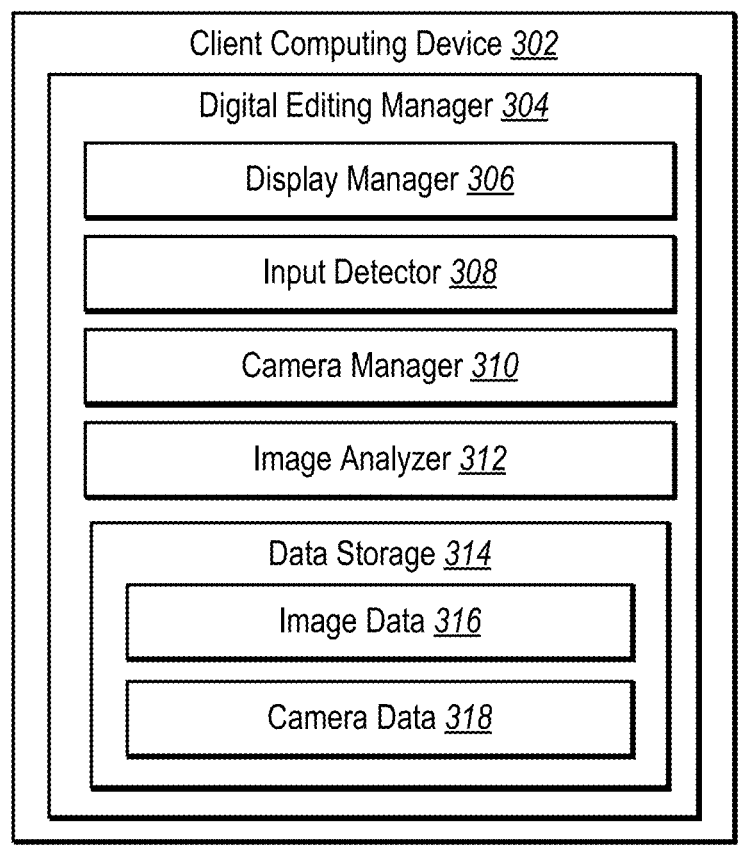
FIG. 3 illustrates a schematic diagram of the digital content creation/editing system in accordance with one or more embodiments.

FIGS. 1A-2D and their related descriptions detail the functions and features of the digital content creation/editing system with regard to a series of user interfaces with which a user can interact. FIG. 3 illustrates an example architecture for the digital content creation/editing system. For example, as shown in FIG. 3, the digital content creation/editing system includes a digital editing manager 304 installed on a client-computing device 302. In one or more embodiments, the digital editing manager 304 is a native application installed on the client-computing device 302. For instance, the digital editing manager 304 may be a mobile application that installs and runs on a client device with a touch screen, such as a smart phone or a tablet. Alternatively, the digital content creation/editing system can run on a non-touch screen enabled device.

Thus, the client-computing device 302 can be any type of computing device (e.g., a desktop or laptop), but is preferably a handheld device such as a smart phone, a tablet, a personal digital assistant, a smart wearable (e.g., a smart watch or enhanced eyewear), etc. In additional or alternative embodiments, the digital editing manager 304 is a desktop application, widget, or other form of a native computer program. Alternatively, the digital editing manager 304 may be a remote application accessed by the client-computing device 302 over a network, or may be a web application that is executed with a web browser of the client-computing device 302.

As shown in FIG. 3, the digital editing manager 304 includes, but is not limited to, a display manager 306, an input detector 308, a camera manager 310, an image analyzer 312, and a data storage 314. In one or more embodiments, the components 304-314 comprise software, hardware, or both. For example, the components 304-314 can comprise computing instructions stored on a non-transitory computer-readable storage medium and executable by at least one processor of the client-computing device 302. When executed by the at least one processor, the computing-executable instructions cause the client-computing device 302 to perform the methods and processes described herein. Alternatively, the components 304-314 can comprise hardware, such as a special purpose processing device to perform a certain function or group of functions. Additionally or alternatively, the components 304-314 can comprise a combination of computer-executable instructions and hardware.

As mentioned above, and as shown in FIG. 3, the digital editing manager 304 includes a display manager 306. The display manager 306 provides, manages, and/or controls a graphical user interface (or simply "user interface") that allows a user to edit digital images. For example, the display manager 306 provides a user interface that facilitates interactions with a display. Likewise, the display manager 306 provides a user interface that displays information provided by other components 308-314 of the digital editing manager 304.

More specifically, the display manager 306 facilitates the display of a user interface (e.g., by way of a display device associated with the client-computing device 302). For example, the user interface is composed of a plurality of graphical components, objects, and/or elements that allow a user to interact with the digital editing manager 304. More particularly, the display manager 306 directs the client-computing device 302 to display a group of graphical components, objects, and/or elements as directed by the digital editing manager 304.

As further illustrated in FIG. 3, the digital editing manager 304 includes an input detector 308. In one or more embodiments, the input detector 308 detects, receives, and/or facilitates user input in any suitable manner. In some examples, the input detector 308 detects one or more user interactions with respect to the user interface. As referred to herein, a "user interaction" means a single interaction, or combination of interactions, received from a user by way of one or more input devices.

For example, the input detector 306 detects a user interaction from a keyboard, mouse, touch pad, touch screen, and/or any other input device. In the event the client-computing device 302 includes a touch screen, the input detector 308 detects one or more touch gestures (e.g., swipe gestures, tap gestures, pinch gestures, or reverse pinch gestures, etc.) from a user that forms a user interaction. In some examples, a user provides the touch gestures in relation to and/or directed at one or more graphical objects or graphical elements of a user interface.

The input detector 308 may additionally, or alternatively, receive data representative of a user interaction. For example, the input detector 308 receives one or more user configurable parameters from a user, one or more user commands from the user, and/or any other suitable user input. The input detector 308 may also receive input data from one or more components of the digital editing manager 304.

The digital editing manager 304 performs one or more functions in response to the input detector 308 detecting user input and/or receiving other data. Generally, a user can control, navigate, and otherwise use the digital editing manager 304 by providing one or more user inputs that the input detector 308 can detect. For example, in response to the input detector 308 detecting user input, the display manager 306 allows the user to view data, interact with various controls, or edit digital images. In addition, in response to the input detector 308 detecting user input, the display manager 306 allows a user to navigate through one or more user interfaces to view, edit, save, and share a digital image. For example, a user may provide input (e.g., via a button click, a list item selection, a drag-and-drop, etc.) indicating an edit to a digital image. In response to the input detector 308 detecting the input, the digital editing manager 304 takes appropriate action in response to the detected user input.

As shown in FIG. 3, the digital editing manager 304 also includes a camera manager 310. As discussed above, the digital content creation/editing system extracts one or more colors from a live camera feed in response to an indication from the user to begin that process. In one or more embodiments, the user indicates his desire to begin the color extraction process by pointing the camera of the client-computing device 302 at one object or scene for a threshold amount of time. Accordingly, the camera manager 310 determines when the camera has been held still for the threshold amount of time.

As discussed above, the camera manager 310 determines when the camera has been held still for the threshold amount of time. In one or more embodiments, a live camera feed from the camera of the client-computing device typically consists of a series of images captured by the camera in quick succession. Accordingly, in order to determine that the user desires to extract a color palette from the live camera feed, the camera manager 310 compares two or more of the series of images captured by the camera. For example, the camera manager 310 compares a newly captured image to an image previously captured (e.g., an image captured at the beginning of the threshold amount of time relative to the newly captured image). If the images are the same within a threshold level of similarity, the camera manager 310 determines that the user has pointed the camera at the same object for the threshold amount of time, and thus desires to begin the color extraction process.

Additionally, in response to determining that the user desires to begin the color extraction process, the camera manager 310 provides the live camera feed to the image analyzer 312 for further analysis. As discussed above, in performing analysis of the live camera feed, the digital content creation/editing system utilizes a representative image taken from the live camera feed during the threshold amount of time. Accordingly, the camera manager 310 provides the representative image to the image analyzer 312.

As discussed above, and as illustrated in FIG. 3, the digital editing manager 304 further includes the image analyzer 312. In one or more embodiments, the image analyzer 312 performs the color analysis of both the representative image and the input digital design. As discussed above, the image analyzer 312 performs the color analysis by identifying colors in the representative image and/or the input digital design pixel-by-pixel along with a running tally of how many pixels include a given color. The color analysis results in a list that details what percentage of the representative image and/or the input digital design are taken up by each identified color.

The image analyzer 312 further assigns a score to each identified color from the representative image and/or the input digital design. In at least one embodiment, the assigned score for a particular color is representative of the percentage of the representative image and/or input digital design that is taken up by the color. For example, if a particular color takes up a large percentage of the representative image and/or input digital design, the image analyzer 312 assigns a high score to the particular color. Similarly, if the particular color takes up a small percentage of the representative image and/or input digital design, the image analyzer 312 assigns a low score to the particular color. Thus, the image analyzer 312 can identify similar scores across the representative image and the input digital design, even when specific percentages between the representative image and the input digital design are not similar.

The image analyzer 312 also creates a color palette based on the highest scoring colors identified in the representative image. As described above, the image analyzer 312 can identify a number of top-scoring colors from the representative image in the color palette. In at least one embodiment, the number of top-scoring colors that the image analyzer 312 includes in the color palette is a user-configurable number.

Additionally, the image analyzer 312 applies the color palette to the input digital design. For example, to apply the color palette to the input digital design, the image analyzer 312 identifies colors in the input digital design with assigned scores that are similar to the assigned scores of the colors in the color palette. The image analyzer 312 then substitutes colors in the input digital design with similarly scored colors from the color palette.

After the image analyzer 312 applies the color palette to the input digital design, the image analyzer 312 further correct the input digital design in order to preserve legibility and contrast. For example, the image analyzer 312 identifies one or more areas in the input digital design that have lost contrast in the input digital design due to the application of the color palette. In at least one embodiment, the image analyzer 312 particularly focuses on any contrast lost in relation to text in the input digital design. In response to a determination that contrast and legibility have been lost, the image analyzer 312 corrects the applied colors by changing a particular color (e.g., change the color shade, color hue, color saturation, etc.).

Also as discussed above, the image analyzer 312 modifies the input digital design in response to a user interacting with one or more color indicators. For example, in response to the user dragging a color indicator from one area of the representative image to another area of the representative image, the image analyzer 312 identifies a new color in the representative image associated with the new location of the dragged color indicator and applies the new color to the input digital design. In one or more embodiments, the image analyzer 312 applies the new color by first identifying the original color associated with the dragged color indicator in the input digital design, and then swapping the original color in the input digital design with the new color.

Also as mentioned above, and as illustrated in FIG. 3, the digital editing manager 304 includes a data storage 314. The data storage 314 can store and maintain image data 316 and camera data 318. In one or more embodiments, the image data 316 is representative of image information, such as described herein. Also, in one or more embodiments, the camera data 318 is representative of camera information, such as described herein.

Figure 4:
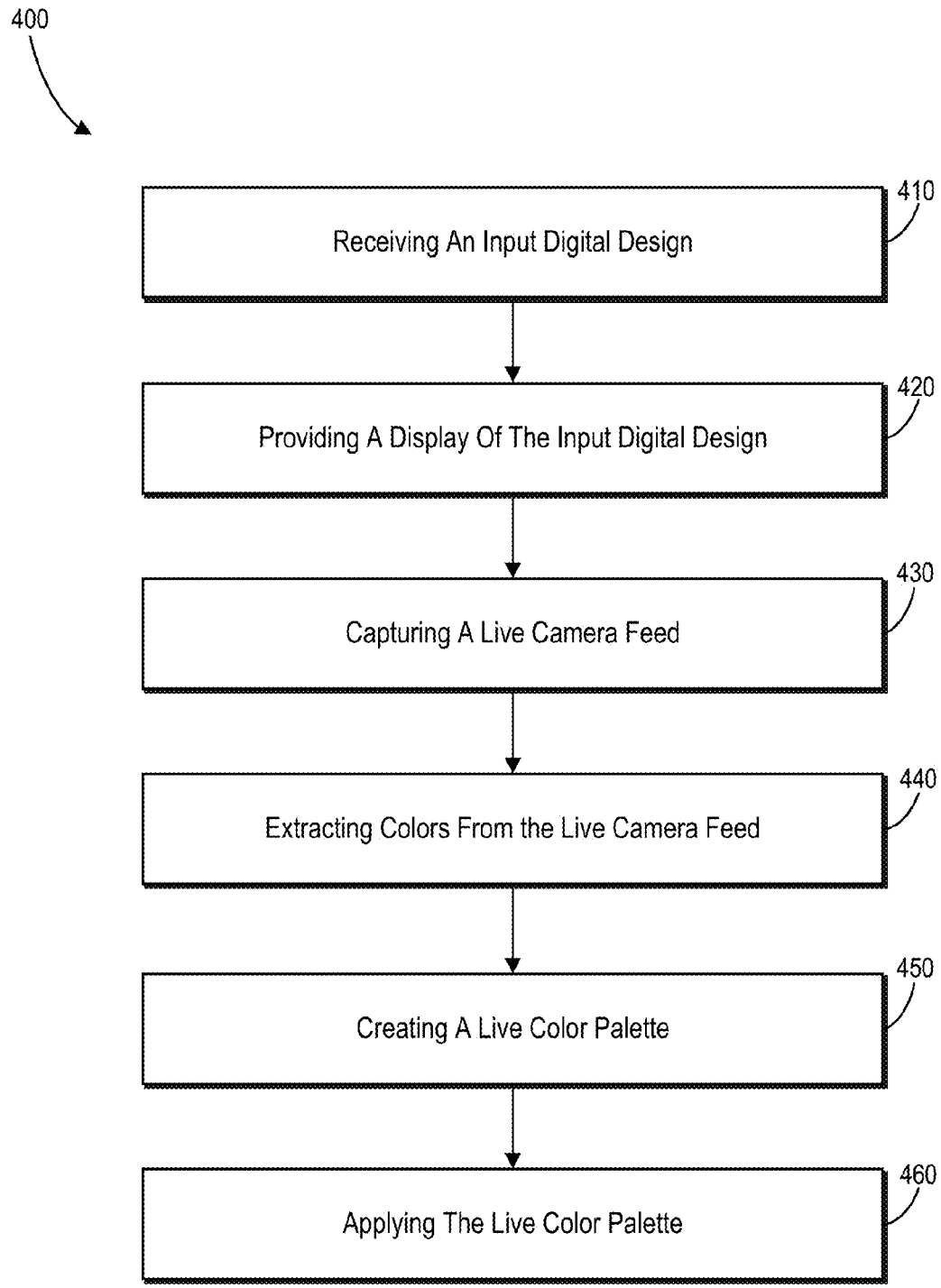
FIG. 4 illustrates a flowchart of a series of acts in a method of extracting dominant colors from a live camera feed and applying the extracted colors to an input digital design in real time in accordance with one or more embodiments.

FIGS. 1A-3, the corresponding text, and the examples provide a number of different methods, systems, and devices for extracting dominant colors from a live camera feed and applying the extracted colors to an input digital design. In addition to the foregoing, embodiments can also be described in terms of flowcharts comprising acts and steps in a method for accomplishing a particular result. For example, FIG. 4 illustrates a flowchart illustrating acts and steps in a method of extracting dominant colors from a live camera feed and applying the extracted colors to an input digital design. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of extracting dominant colors from a live camera feed and applying the extracted colors to an input digital design. The method 400 includes an act 410 of receiving an input digital design. In particular, the act 410 involves receiving a selection of an input digital design (e.g., the input digital design 104a, as shown in FIGS. 1B-1F).

The method 400 also includes an act 420 of providing a display of the input digital design. In particular, the act 420 involves providing a display of the input digital design in a first portion of a user interface (e.g., the editing GUI 106, as shown in FIGS. 1B-1F). For example, in one embodiment, the first portion of the user interface is an editable portion of the user interface.

The method 400 includes an act 430 of capturing a live camera feed. In particular, the act 430 involves capturing a live camera feed and displaying the live camera feed in a second portion of the user interface (e.g., the camera viewfinder 128, as shown in FIGS. 1C-1F). For example, in one embodiment, capturing a live camera feed comprises capturing the live camera feed from a camera of a client-computing device.

Additionally, the method 400 includes an act 440 of extracting colors from the live camera feed. In particular, the act 440 involves extracting one or more colors from the live camera feed (e.g., as displayed in the camera viewfinder 128, as shown in FIGS. 1C-1F). For example, extracting one or more colors from the live camera feed comprises determining that the live camera feed has not changed for a predetermined amount of time, identifying all colors present in the live camera feed after the predetermined amount of time, assigning a score to each color present in the live camera feed, and identifying the highest scoring colors of the colors present in the live camera feed. In at least one embodiment, the method 400 further comprises assigning a score to each extracted one or more colors present from the live camera feed, wherein assigning a score comprises, for each color present in the live camera feed, determining what percentage of the live camera feed is taken up by the color, and calculating a score for the color based on the determined percentage.

The method 400 further includes an act 450 of creating a color palette. In particular, the act 450 involves creating a color palette based on the extracted one or more colors from the live camera stream. In one or more embodiments, creating a color palette based on the extracted one or more colors includes creating a color palette of the one or more of the extracted one or more colors; determining whether any of the extracted one or more colors causes a loss of contrast when included in the input digital design, and exchanging any of the extracted one or more colors that cause a loss of contrast with one or more additional colors that preserve contrast when included in the input digital design.

The method 400 further includes an act 460 of applying the color palette. In particular, the act 460 involves applying the color palette to the received input digital design (e.g., the input digital design 104a, as shown in FIGS. 1E and 1F). In one or more embodiments, applying the color palette to the input digital design includes identifying one or more colors within the input digital design, and determining what percentage of the input digital design is taken up by each of the identified one or more colors. In at least one embodiment, applying the color palette to the input digital design further includes applying the color palette to the input digital design based on the determined percentages for the one or more colors within the input digital design and determined percentages for the one or more colors in the live camera feed.

In at least one embodiment, the method 400 includes an act of automatically adjusting the color palette based on one or more colors of the received input digital design to preserve legibility and contrast. Additionally, in at least one embodiment, the method 400 further includes acts of detecting a change in the live camera feed, extracting one or more colors from the changed live camera feed, creating an updated color palette based on the extracted one or more colors from the changed live camera feed, and applying the updated color palette to the input digital design.

Figure 5:
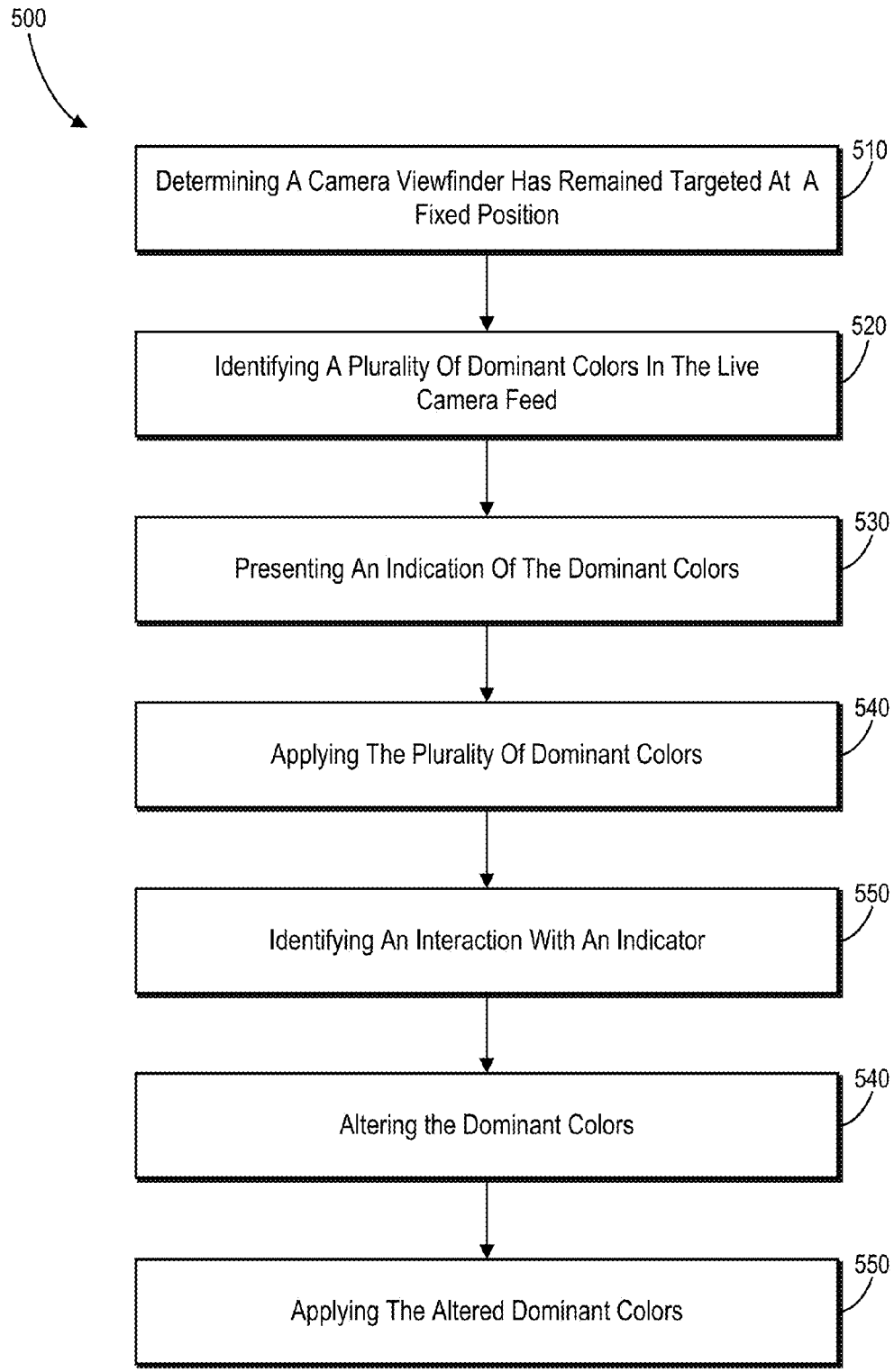
FIG. 5 illustrates another flowchart of a series of acts in a method of extracting dominant colors from a live camera feed and applying the extracted colors to an input digital design in real time in accordance with one or more embodiments.

FIG. 5 illustrates a flowchart of another example method 500 of extracting dominant colors from a live camera feed and applying the extracted colors to an input digital design. The method 500 includes an act 510 of determining a camera viewfinder has remained targeted at a fixed position. In particular, the act 510 involves determining a camera viewfinder (e.g., the camera viewfinder 128, as shown in FIGS. 1C-1F) capturing a live camera feed from a camera associated with a computing device has remained targeted at a fixed position for a threshold amount of time. In one or more embodiments, determining a camera viewfinder has remained targeted at a fixed position for a threshold amount of time includes capturing images from the live camera feed at fixed intervals within the threshold amount of time, comparing each captured image to an immediately preceding captured image, and determining, based on the comparison, that two or more captured images are similar within a threshold level.

The method 500 also includes an act 520 of identifying a plurality of dominant colors in the live camera feed. In particular, the act 520 involves identifying, in response to determining the camera viewfinder has remained targeted at the fixed position for the threshold amount of time, a plurality of dominant colors in the live camera feed. In one or more embodiments, identifying a plurality of dominant colors in the live camera feed includes identifying all colors present in a representative image taken from the live camera feed during the threshold amount of time, assigning a score to each color present in the representative image, and identifying the highest scoring colors of the colors present in the representative image. In at least one embodiment, assigning a score to each color present in the representative image includes, for each color present in the representative image, determining what percentage of the representative image is taken up by the color, and calculating a score for the color based on the determined percentage.

In one or more embodiments, the method 500 further includes an act of creating a color palette based on the colors present in the representative image. For example, creating a color palette includes identifying one or more highest scoring colors present in the representative image. Additionally, in at least one embodiment, creating a color palette further includes creating a color palette, wherein the color palette is based on the highest scoring colors of the colors present in the representative image.

Furthermore, the method 500 includes an act 530 of presenting an indication of the dominant colors. In particular, the act 530 involves presenting, in real time, an indication of each of the plurality of dominant colors (e.g., the color indicators 130a, 130b, and 130c, as shown in FIGS. 1E and 1F) in the camera viewfinder. For example, in one embodiment, presenting the indication of each of the plurality of dominant colors in the camera viewfinder includes presenting a series of circle indicators positioned over each of the plurality of dominant colors.

The method 500 includes an act 540 of applying the plurality of dominant colors. In particular, the act 540 involves applying, in real time, the plurality of dominant colors to an input digital design (e.g., as shown in FIGS. 1E and 1F). For example, in one embodiment, applying, in real time, the plurality of dominant colors to the input digital design includes identifying one or more page items within the input digital design, and determining what percentage of the of the input digital design is taken up by each of the identified page items. In additional embodiments, applying, in real time, the plurality of dominant colors to the input digital design further includes determining what percentage of the representative image is taken up by each of the one or more highest scoring colors in the color palette, and mapping one or more page items of the input digital design to the one or more page highest scoring colors in the color palette based on the determined percentages for the one or more page items of the input digital design and the determined percentages for the one or more highest scoring colors in the representative image.

The method 500 includes an act 550 of identifying an interaction with an indicator. In particular, the act 550 involves identifying an interaction moving an indication of a dominant colors (e.g., as shown between FIGS. 1E and 1F). For example, in one embodiment, identifying an interaction moving the indication includes identifying a touch-and-slide touch gesture.

The method 500 also includes an act 560 of altering the dominant colors. In particular, the act 560 involves altering the dominant colors associated with the moved indication. The method 500 further includes an act 570 of applying the altered dominant colors. In particular, the act 570 involves applying, in real time, the altered dominant colors to the input digital design (e.g., as shown in FIG. 1F).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
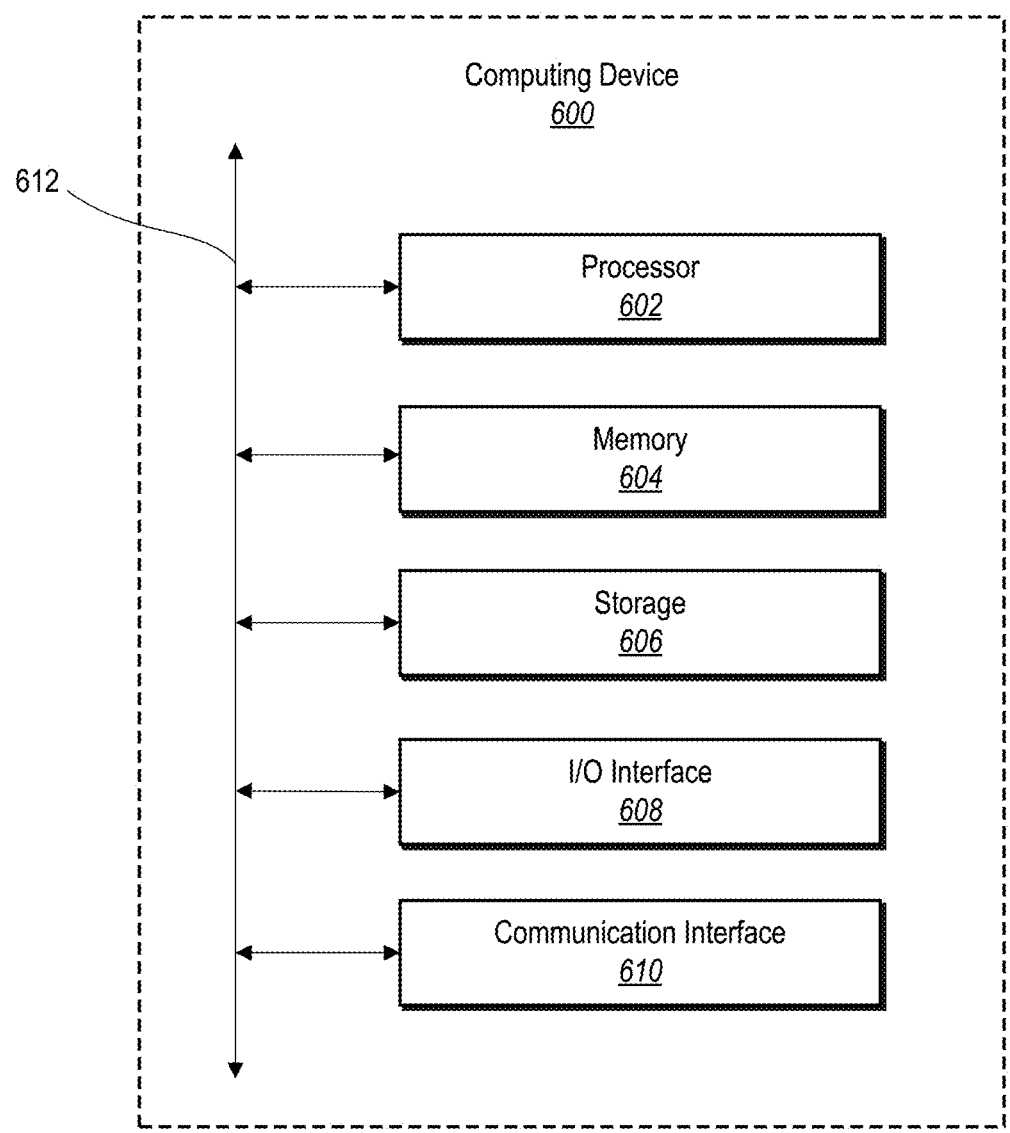
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that one or more computing devices such as the computing device 600 may implement the digital content creation/editing system. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
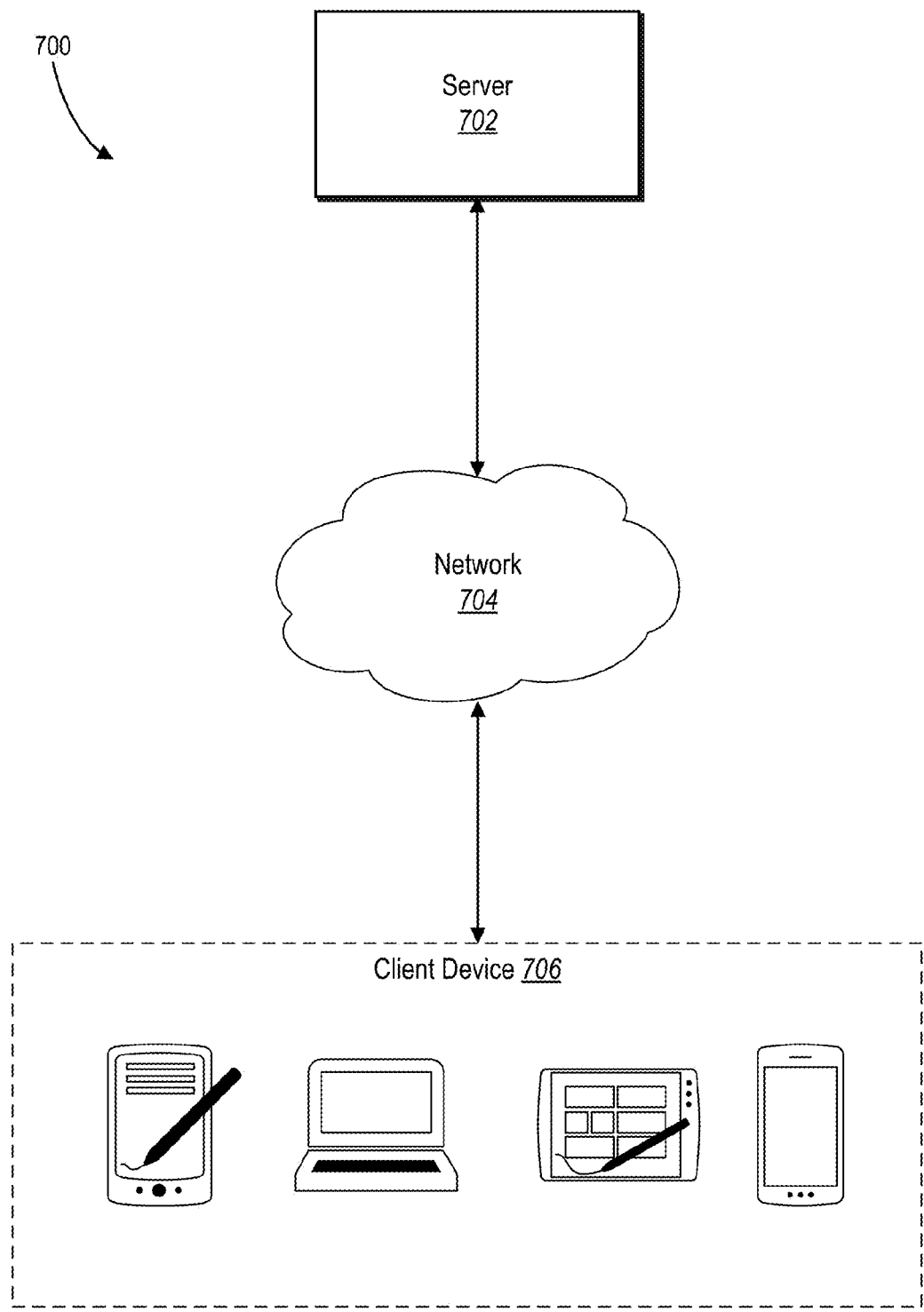
FIG. 7 is an example network environment in which the digital content creation/editing system can operate in accordance with one or more embodiments.

FIG. 7 illustrates an example network environment 700 of in which the digital editing manager 404 can operate. The network environment 700 includes a client system 706, and a server 702 connected to each other by a network 704. Although FIG. 7 illustrates a particular arrangement of the client system 706, the server 702, and the network 704, this disclosure contemplates any suitable arrangement of the client system 706, the server 702, and the network 704. As an example and not by way of limitation, the client system 706 and the server 702 may be connected to each other directly, bypassing network 704. As another example, the client system 706 and the server 702 may be physically or logically co-located with each other in whole or in part. Moreover, although FIG. 7 illustrates a particular number of client systems 706, servers 702, and networks 704, this disclosure contemplates any suitable number of client systems 706, servers 702, and networks 704. As an example and not by way of limitation, network environment 700 may include multiple client system 706, servers 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and the server 702 to the communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 702 may be capable of linking a variety of entities. As an example and not by way of limitation, server 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 702. In particular embodiments, however, the server 702 and third-party systems may operate in conjunction with each other to provide analytics services to users of the server 702 or third-party systems. In this sense, server 702 may provide a platform, or backbone, which other systems, such as third-party systems, may use to provide analytic or data/tracking services and functionality to users across the Internet.

In particular embodiments, a third-party system may include a third-party content object provider. A third-party content object provider may include one or more sources of content objects, which may be communicated to a client system 706. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 702 may include a variety of servers, sub-systems, programs, modules, logs, and data stores. In particular embodiments, server 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 702 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method for creating a color palette based on a live camera feed comprising:
  receiving, in response to detected user input on a client device, a selection of an input digital design;
  providing a display of the input digital design in a first portion of a user interface on the client device;
  capturing, from a camera of the client device, a live camera feed and simultaneously displaying the live camera feed in a second portion of the user interface on the client device; and
  in response to determining that the live camera feed remains targeted at a current fixed position for a threshold amount of time:
    extracting one or more colors from the live camera feed from the camera of the client device displayed in the second portion of the user interface on the client device,
    creating a color palette based on the extracted one or more colors from the live camera feed from the camera of the client device,
    overlaying one or more color indicators corresponding to the color palette on the live camera feed in the second portion of the user interface on the client device, and
    applying the color palette to the received input digital design in the first portion of the user interface of the client device while the live camera feed from the camera of the client device is simultaneously displayed in the second portion of the user interface of the client device.

2. The method as recited in claim 1, further comprising: detecting a change in the live camera feed from the camera of the client device displayed in the second portion of the user interface on the client device;

extracting one or more colors from the changed live camera feed from the camera of the client device displayed in the second portion of the user interface on the client device;

creating an updated color palette based on the extracted one or more colors from the changed live camera feed from the camera of the client device displayed in the second portion of the user interface on the client device; and applying the updated color palette to the input digital design in the first portion of the user interface on the client device while the changed live camera feed from the camera of the client device is simultaneously displayed in the second portion of the user interface on the client device.

3. The method as recited in claim 1, wherein extracting one or more colors from the live camera feed from the camera of the client device displayed in the second portion of the user interface on the client device comprises:

identifying all colors present in the live camera feed from the camera of the client device after the threshold amount of time;

assigning a score to each color present in the live camera feed from the camera of the client device; and identifying the highest scoring colors of the colors present in the live camera feed from the camera of the client device.

4. The method as recited in claim 3, further comprising assigning a score to each extracted one or more colors present from the live camera feed from the camera of the client device, wherein assigning a score comprises:

for each color present in the live camera feed from the camera of the client device:

determining what percentage of the live camera feed from the camera of the client device is taken up by the color; and calculating a score for the color based on the determined percentage.

5. The method as recited in claim 1, wherein creating a color palette based on the extracted one or more colors comprises:

creating a color palette of the one or more of the extracted one or more colors;

determining whether any of the extracted one or more colors causes a loss of contrast when included in the input digital design; and exchanging any of the extracted one or more colors that cause a loss of contrast with one or more additional colors that preserve contrast when included in the input digital design.

6. The method as recited in claim 1, wherein applying the color palette to the input digital design in the first portion of the user interface on the client device while the live camera feed from the camera of the client device is simultaneously displayed in the second portion of the user interface on the client device comprises:

identifying one or more colors within the input digital design displayed in the first portion of the user interface on the client device; and determining what percentage of the input digital design is taken up by each of the identified one or more colors.

7. The method as recited in claim 6, wherein applying the color palette to the input digital design in the first portion of the user interface on the client device further comprises applying the color palette to the input digital design based on the determined percentages for the one or more colors within the input digital design and determined percentages for the one or more colors in the live camera feed from the camera of the client device.

8. The method as recited in claim 1, further comprising automatically adjusting the color palette based on one or more colors of the received input digital design to preserve legibility and contrast.

9. A system comprising:
a client device;
at least one processor; and
at least one non-transitory computer-readable storage medium storing instructions thereon that, when executed by the at least one processor, cause the client device to:

receive, in response to detected user input on the client device, a selection of an input digital design;

provide a display of the input digital design in a first portion of a user interface on the client device;

capture, from a camera of the client device, a live camera feed and simultaneously display the live camera feed in a second portion of the user interface on the client device; and in response to determining that the live camera feed remains targeted at a current fixed position for a threshold amount of time:

extract one or more colors from the live camera feed from the camera of the client device displayed in the second portion of the user interface on the client device, create a color palette based on the extracted one or more colors from the live camera feed from the camera of the client device, overlay one or more color indicators corresponding to the color palette on the live camera feed in the second portion of the user interface on the client device, and apply the color palette to the received input digital design in the first portion of the user interface of the client device while the live camera feed from the camera of the client device is simultaneously displayed in the second portion of the user interface of the client device.

10. The system as recited in claim 9, wherein the instructions, when executed by the at least one processor, cause the client device to extract the one or more colors from the live camera feed from the camera of the client device displayed in the second portion of the user interface on the client device by performing steps comprising:

identifying all colors present in the live camera feed from the camera of the client device after the threshold amount of time;

assigning a score to each color present in the live camera feed from the camera of the client device; and identifying the highest scoring colors of the colors present in the live camera feed from the camera of the client device.

11. The system as recited in claim 10, wherein assigning a score to each color present in the live camera feed from the camera of the client device comprises:

for each color present in the live camera feed from the camera of the client device:

determining what percentage of the live camera feed from the camera of the client device is taken up by the color; and calculating a score for the color based on the determined percentage.

12. A non-transitory computer-readable medium storing instructions thereon that, when executed by at least one processor, cause a client device to:
- receive, in response to detected user input on the client device, a selection of an input digital design;
- provide a display of the input digital design in a first portion of a user interface on the client device;
- capture, from a camera of the client device, a live camera feed and simultaneously display the live camera feed in a second portion of the user interface on the client device; and
- in response to a determination that the live camera feed remains targeted at a current fixed position for a threshold amount of time:
  - extract one or more colors from the live camera feed from the camera of the client device displayed in the second portion of the user interface on the client device,
  - create a color palette based on the extracted one or more colors from the live camera feed from the camera of the client device,
  - overlay one or more color indicators corresponding to the color palette on the live camera feed in the second portion of the user interface on the client device, and
  - apply the color palette to the received input digital design in the first portion of the user interface of the client device while the live camera feed from the camera of the client device is simultaneously displayed in the second portion of the user interface of the client device.

13. The non-transitory computer-readable medium as recited in claim 12, further storing instructions thereon that, when executed by the at least one processor, cause the client device to:
- detect a change in the live camera feed from the camera of the client device displayed in the second portion of the user interface on the client device;
- extract one or more colors from the changed live camera feed from the camera of the client device displayed in the second portion of the user interface on the client device;
- create an updated color palette based on the extracted one or more colors from the changed live camera feed from the camera of the client device displayed in the second portion of the user interface on the client device; and
- apply the updated color palette to the input digital design in the first portion of the user interface on the client device while the changed live camera feed from the camera of the client device is simultaneously displayed in the second portion of the user interface on the client device.

14. The non-transitory computer-readable medium as recited in claim 13, wherein the instructions, when executed by the at least one processor, cause the client device to extract one or more colors from the live camera feed from the camera of the client device displayed in the second portion of the user interface on the client device by performing steps comprising:
- identifying all colors present in the live camera feed from the camera of the client device after the threshold amount of time;
- assigning a score to each color present in the live camera feed from the camera of the client device; and
- identifying the highest scoring colors of the colors present in the live camera feed from the camera of the client device.

15. The non-transitory computer-readable medium as recited in claim 14, further storing instructions thereon that, when executed by the at least one processor, cause the client device to assign a score to each extracted one or more colors present from the live camera feed from the camera of the client device, wherein assigning a score comprises:
- for each color present in the live camera feed from the camera of the client device:
  - determining what percentage of the live camera feed from the camera of the client device is taken up by the color; and
  - calculating a score for the color based on the determined percentage.

16. The non-transitory computer-readable medium as recited in claim 15, wherein the instructions, when executed by the at least one processor, cause the client device to create a color palette based on the extracted one or more colors by performing steps comprising:
- creating a color palette of the one or more of the extracted one or more colors;
- determining whether any of the extracted one or more colors causes a loss of contrast when included in the input digital design; and
- exchanging any of the extracted one or more colors that cause a loss of contrast with one or more additional colors that preserve contrast when included in the input digital design.

17. The non-transitory computer-readable medium as recited in claim 16, wherein the instructions, when executed by the at least one processor, cause the client device to apply the color palette to the input digital design in the first portion of the user interface on the client device while the live camera feed from the camera of the client device is simultaneously display in the second portion of the user interface on the client device by performing steps comprising:
- identifying one or more colors within the input digital design displayed in the first portion of the user interface on the client device; and
- determining what percentage of the input digital design is taken up by each of the identified one or more colors.

18. The non-transitory computer-readable medium as recited in claim 17, wherein the instructions, when executed by the at least one processor, cause the client device to apply the color palette to the input digital design in the first portion of the user interface on the client device by further performing steps comprising applying the color palette to the input digital design based on the determined percentages for the one or more colors within the input digital design and determined percentages for the one or more colors in the live camera feed from the camera of the client device.

19. The non-transitory computer-readable medium as recited in claim 18, further storing instructions thereon that, when executed by the at least one processor, cause the client device to automatically adjust the color palette based on one or more colors of the received input digital design to preserve legibility and contrast.

20. The non-transitory computer-readable medium as recited in claim 19,
- wherein the input digital design comprises an underlying image and an overlay; and
- wherein the instructions, when executed by the at least one processor, cause the client device to apply the color palette to the overlay of the input digital design in the first portion of the user interface of the client device.

* * * * *